(12) United States Patent
Branson

(10) Patent No.: US 6,212,850 B1
(45) Date of Patent: Apr. 10, 2001

(54) METHOD AND APPARATUS FOR STRUCTURAL CONVERSION OF POULTRY HOUSES

(76) Inventor: John Branson, 2003 Sam Bell Rd., Clarksville, GA (US) 30523

( * ) Notice: Subject to any disclaimer, the term of this patent is extended or adjusted under 35 U.S.C. 154(b) by 0 days.

(21) Appl. No.: 09/236,157

(22) Filed: Jan. 22, 1999

Related U.S. Application Data

(60) Provisional application No. 60/072,229, filed on Jan. 23, 1998.

(51) Int. Cl.[7] .............................. A01K 31/08; E04B 7/08
(52) U.S. Cl. ......................... 52/745.01; 52/93.1; 52/641; 52/643; 52/645; 52/653.1; 52/690; 119/437
(58) Field of Search ..................... 119/437, 436; 52/745.01, 745.18, 745.2, 690, 653.1, 645, 646, 643, 641, 637, 90.2, 93.1, 71, 745.13, 745.14

(56) References Cited

U.S. PATENT DOCUMENTS

| | | | | |
|---|---|---|---|---|
| 822,295 | * | 6/1906 | Muller | 52/690 X |
| 1,981,418 | * | 11/1934 | Kreutzer | 119/436 |
| 2,263,214 | * | 11/1941 | Larkin | 52/93.1 |
| 2,480,330 | * | 8/1949 | Kump | 52/745.13 X |
| 2,871,997 | * | 2/1959 | Simpson et al. | 52/93.1 |
| 2,989,154 | * | 6/1961 | Colby, Jr. | 52/93.1 |
| 3,172,507 | * | 3/1965 | Blyveis | 52/643 X |
| 3,184,012 | * | 5/1965 | Fujishima et al. | 52/93.1 |
| 3,309,120 | * | 3/1967 | Wada | 52/93.1 X |
| 3,462,895 | * | 8/1969 | Wormser | 52/93.1 |
| 3,530,623 | * | 9/1970 | Burton | 52/644 X |
| 3,708,928 | * | 1/1973 | Gaspers | 52/93.1 |
| 3,832,819 | * | 9/1974 | Houdin | 52/745.2 X |
| 4,809,480 | * | 3/1989 | Hale | 52/93.1 X |
| 5,189,983 | * | 3/1993 | Aitchison | 119/437 |
| 5,381,634 | * | 1/1995 | Pietrogrande et al. | 52/71 X |

FOREIGN PATENT DOCUMENTS

| | | | | |
|---|---|---|---|---|
| 594178 | * | 3/1960 | (CA) | 52/641 |
| 2617525 | * | 1/1989 | (FR) | 52/690 |
| 555074 | * | 8/1943 | (GB) | 52/641 |
| 511262 | * | 3/1959 | (IT) | 52/641 |

OTHER PUBLICATIONS

Iouree, Harold, "Sectional Steel Buildings of Rigid–Frame Type", Civil Engineering p. 436, 1943.*

* cited by examiner

*Primary Examiner*—Laura A. Callo
(74) *Attorney, Agent, or Firm*—Gardner Groff Mehrman & Josephic, P.C.

(57) ABSTRACT

A method and apparatus for converting a post-style poultry house to a clear span style poultry house. The apparatus includes a truss assembly including a center truss section adapted to be mounted to the roof beams and first and second outer truss sections adapted to be secured to the center truss section. The out truss sections each comprise substantially upright portions and an inclined portion extending therefrom. The trusses are installed without the removal of the roof or beams of the existing post-style poultry house. In installing the trusses, first the center sections of the trusses are attached to the roof beams and then the upper ends of the outer sections are attached to the center sections. Then the lower ends of the outer sections of the trusses are secured to the poultry house footers. Once the truss sections are all secured to each other and secured to the footers, the posts are cut away and removed.

13 Claims, 8 Drawing Sheets

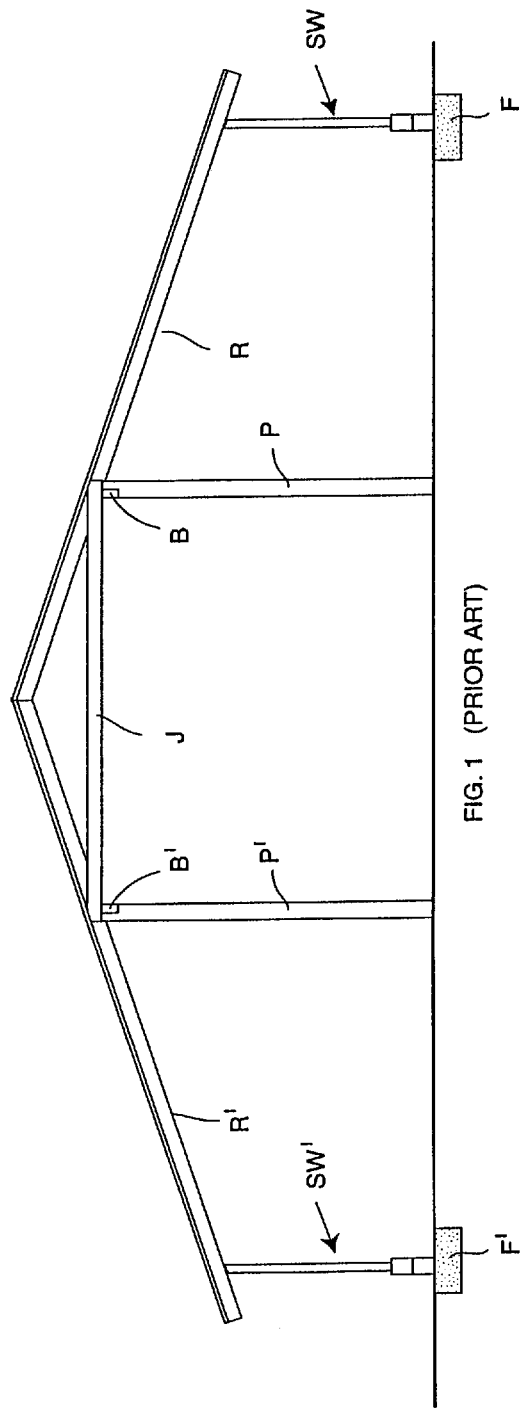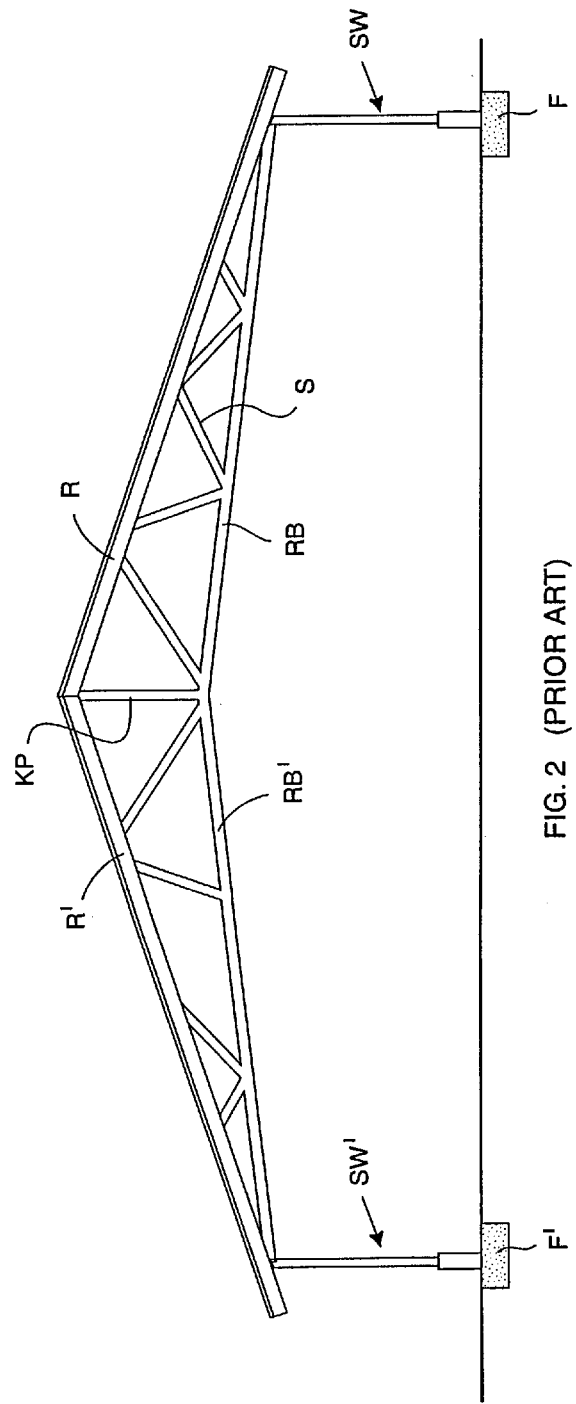
FIG. 1 (PRIOR ART)
FIG. 2 (PRIOR ART)

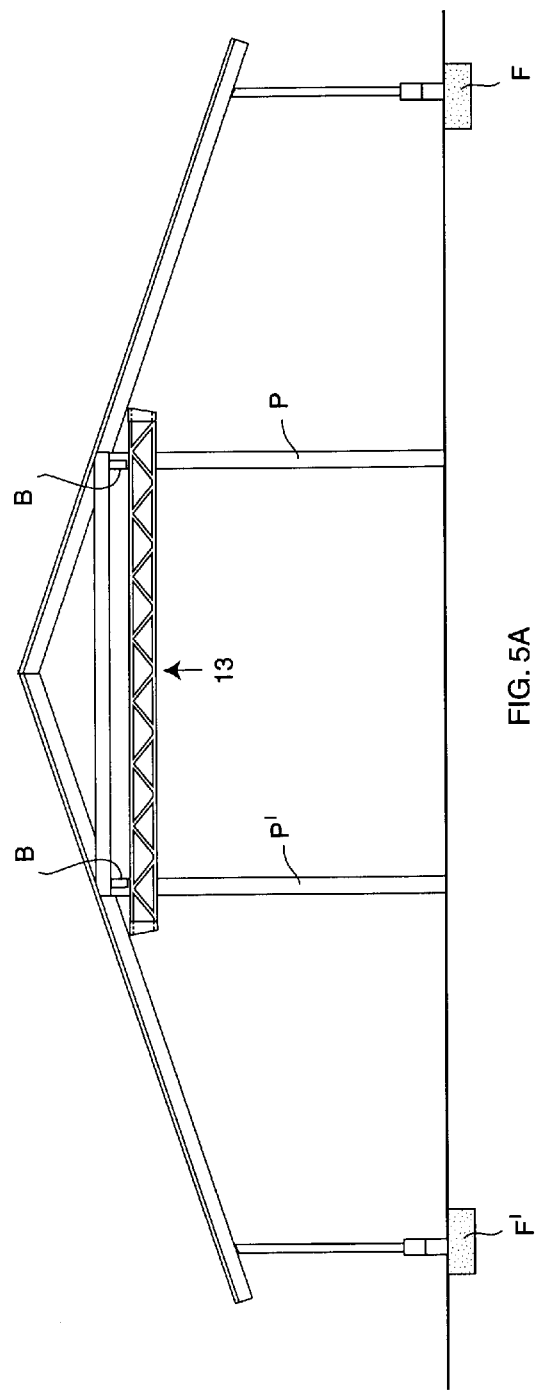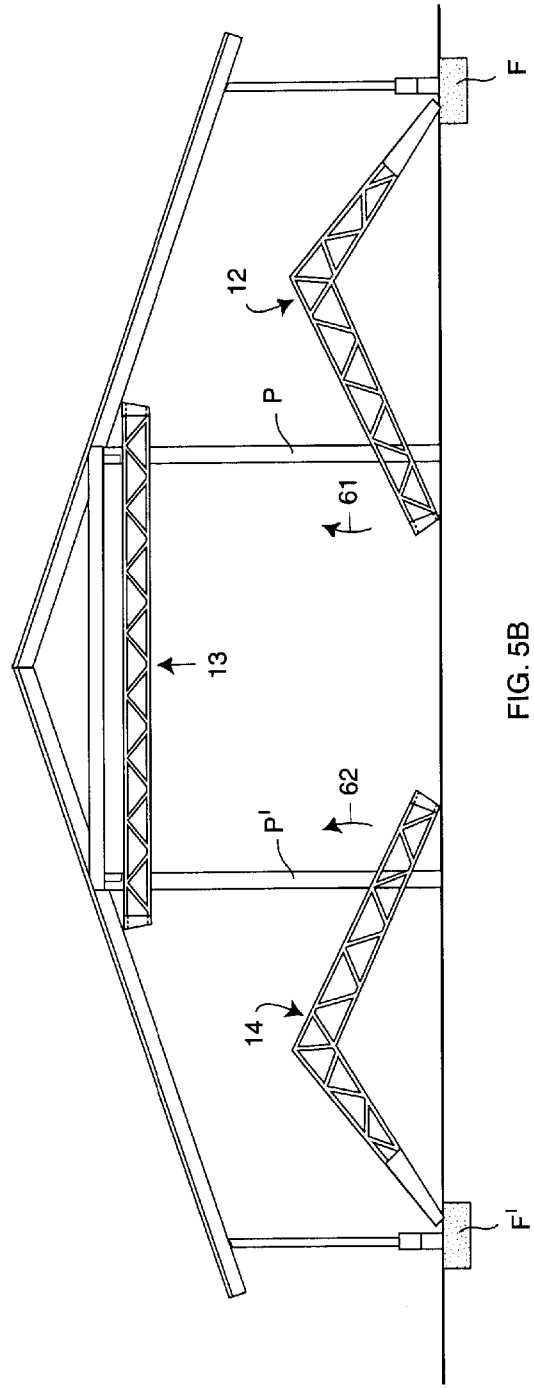

METHOD AND APPARATUS FOR STRUCTURAL CONVERSION OF POULTRY HOUSES

CROSS REFERENCE TO RELATED APPLICATIONS

The present application claims the benefit of provisional patent application Ser. No. 60/072,229, filed on Jan. 23, 1998.

TECHNICAL FIELD

The present invention relates to poultry houses in general and in particular relates to a method and apparatus for converting older post-style poultry houses to a clear span-style poultry house.

BACKGROUND OF THE INVENTION

One common style of prior art poultry house is the so called post-style poultry house. These post-style poultry houses are quite prevalent and typically were built using posts prior to the wide spread use of structural trusses. A typical post-style poultry house is between about 34 and 40 feet wide and about 300 to 500 feet long. The posts in such a house are usually spaced from one another and are used to support the roof of the poultry house.

While a post-style house as just described is sturdy and long-lasting, in recent years changes in poultry harvesting technology have made this less than an ideal design for continued use. For example, traditionally once the poultry are ready to be harvested from the poultry house and to be taken to a processing plant, they are gathered up and placed in cages for transport. Currently, this often is being done manually by picking up poultry and putting them in the cages. More recently, automatic harvesting equipment is being developed which constitutes a self-propelled vehicle with equipment at the front end thereof for gathering the poultry and placing them in cages. Such machinery can be obstructed in its operation by the posts. As a result, there exists a strong economic incentive for replacing the post-style houses with a clear span-style poultry house.

Unfortunately, to simply knock down existing post-style poultry houses and replace them with new, clear span poultry houses is prohibitively expensive for many poultry farmers. Moreover, it is economically wasteful inasmuch as much of the structure of the post-style poultry house might still be in good shape and should not be demolished and discarded. Accordingly, it can be seen that a need yet remains for a method and apparatus for economically converting post-style poultry houses to clear span poultry houses. It is to the provision of such a method and apparatus that the present invention is primarily directed.

SUMMARY OF THE INVENTION

Briefly described, in a first preferred form the present invention comprises a method for converting a post-style poultry house to a clear span-style poultry house.

The poultry house is of the type mounted on footers and including a roof, inclined rafters supporting the roof, and roof beams extending transversely to the rafters and supporting the rafters thereon. Initially, the post-style poultry house has uprights posts supporting the roof beams. The method comprises the steps of (a) installing a series of trusses for supporting the roof beams, and (b) removing the upright posts from the poultry house. The step of installing the series of trusses is carried out without the removal of the roof or beams. The trusses are provided for supporting the roof beams and the roof thereon. Each of the trusses has a center section and two outer sections. The step of installing the trusses comprises (i) attaching the center sections of the trusses to the roof beams, (ii) attaching upper ends of the outer sections to the center sections, and (iii) securing the lower ends of the outer sections to the footers.

Preferably, the step of attaching the center sections to the roof beams comprises attaching mounting brackets to the roof beams and then attaching the center sections to the mounting brackets. Preferably, the center sections are bolted to the outer sections. Also preferably, prior to the completion of the installation of the trusses, any feeding lines or watering lines in the poultry house are lowered.

Alternatively, the step of installing the trusses comprises assembling truss sections into assembled trusses, positioning the assembled trusses under and adjacent the roof beams, and securing the assembled trusses thereto. Preferably, the truss sections are assembled on-site at the poultry house. Also preferably, the assembled trusses are pivotally mounted to the footers (or pilings) and pivoted into position under and adjacent the roof beams.

In another preferred form, the invention comprises a truss apparatus for converting a post-style poultry house to a clear span-style poultry house. The poultry house includes a roof, inclined rafters supporting the roof, roof beams extending transversely to the rafters and supporting the rafters thereon, side walls, and footers supporting the side walls. Initially, the house includes upright posts for supporting the roof beams. The truss apparatus includes a center truss section adapted to be mounted to the roof beams. The truss apparatus further comprises first and second outer truss sections adapted to be secured to the center truss section. The outer truss sections each comprise substantially upright portions and an inclined portion extending therefrom.

Preferably, each of the truss sections are made of a corrosion-resistant metal. Most preferably, the truss sections are galvanized steel or stainless steel. Further, preferably the truss apparatus includes mounting brackets for mounting the center truss section to the roof beams. Also preferably, mounting feet pivotally mount the lower ends of the substantially upright portions of the outer truss sections to the footers. Also preferably, end portions of the center truss sections and end portions of the first and second truss sections each include mounting flanges for bolting the center truss sections to the first and second outer truss sections.

BRIEF DESCRIPTION OF THE DRAWINGS

FIG. 1 is a sectional end view of a prior art post-style poultry house.

FIG. 2 is a sectional end view of a prior art "scissor truss" poultry house.

FIGS. 5A through 5C depict the appearance of the post-style poultry house as it is converted to a clear span-style poultry house according to the present invention.

DETAILED DESCRIPTION OF THE PREFERRED EMBODIMENTS

Figure 3:
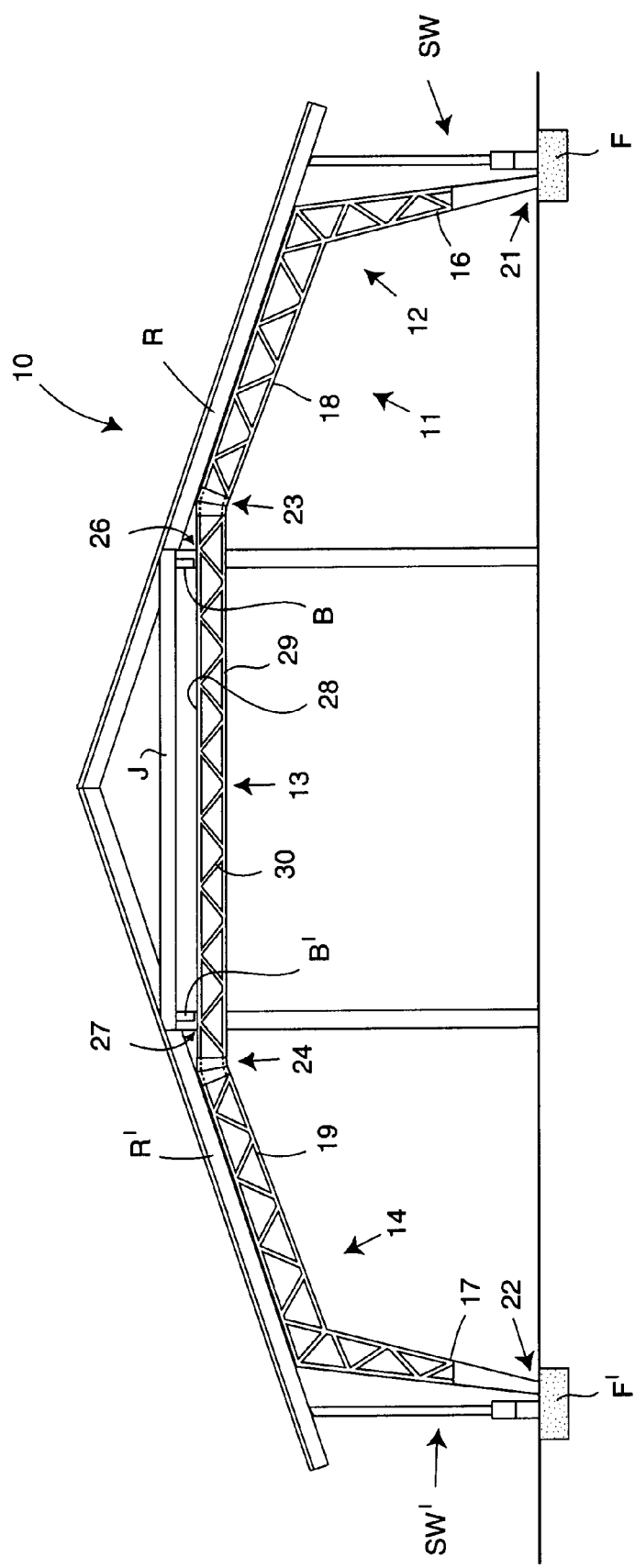
FIG. 3 is a sectional end view of a converted poultry house according to the present invention wherein posts have been removed and new trusses added.

Referring now in detail to the drawing figures, wherein like reference numerals represent like parts throughout the several views, FIG. 1 shows a prior art post-style poultry house. The poultry house shown typifies those poultry houses which were built using posts prior to the wide-spread use of roof trusses. Such a poultry house typically is 34–40 feet wide and 300–500 feet long. The posts in the house, such as P and P' are on 12 foot centers. That is, posts P and P' are approximately 12 feet from each other and also about 12 feet from the side walls SW, SW'. The posts are spaced 12 to 16 feet apart longitudinally. In such a post-style house, there would be two rows of posts running the length of the house, with the rows being about 12 feet apart.

As shown in FIG. 1, the post-style house rests upon a foundation or footer, F, F', and includes side walls positioned thereupon SW, SW'. The side walls include a lower portion which is (typically) concrete block and an upper portion which is a wood frame construction. Rafters, such as rafter R and R', are supported by the side walls and longitudinal roof beams B, B'. The beams run the length of the poultry house and are supported upon the posts P, P'. Joists J coinciding with rafters extend between the posts and rest atop the beams B, B'.

One example of a clear span-style poultry house is shown in FIG. 2 which depicts a "scissor truss" type of poultry house. Such poultry houses as shown in FIG. 2 are more modern than the prior post-style houses as shown in FIG. 1. As a result of the clear span between the side walls, the scissor truss-style of poultry house of FIG. 2 offers important advantages over the post-style house of FIG. 1. One such advantage, in addition to the greater convenience for harvesting equipment, is greater convenience for cleaning out the poultry litter using a tractor. However, one disadvantage of the scissor-type clear span-style poultry house is that not as much clearance is provided beneath the roof for usable space. In the post-style house as depicted in FIG. 1, the roof typically has a 4/12 pitch where there is a four foot rise for every 12 foot of span. In the scissor truss house of FIG. 2, the upper rafter R, R' has a minimum of 5/12 rise, while the lower ridge beam RB, RB' has only a 2/12 rise. Therefore, this makes for a lower ceiling inside the poultry house.

The scissor truss-style house includes a generally delta-shaped truss including the rafters R, R', the ridge beams RB, RB', the king posts KP, and the struts, such as strut S.

The present invention relates to the conversion of a post-style house as depicted in FIG. 1 to provide a clear span between the side walls, similar to the span available in a center truss house of FIG. 2. Moreover, the present invention is directed to a method and apparatus by which a post-style house can be converted to a free span without requiring the removal or replacement of the roof or the rafters of the roof. This can result in a very substantial cost savings, in comparison with alternative ways of doing away with the posts.

Referring now to FIG. 3, a converted poultry house 10 is shown according to a preferred form of the invention. The converted poultry house 10 includes preexisting footers F, F' and side walls SW and SW'. In some existing post-style poultry houses, the footers are small or structurally inadequate and it may be necessary to augment the footers, such as with auxiliary poured concrete pilings. The present inventor has found that a good way to provide such pilings is to bore holes using a large auger, place tubular forms in the holes, and fill the forms with high-strength concrete. Moreover, the converted poultry house 10 also includes pre-existing roof rafters R, R' and roofing material thereon. The converted poultry house 10 also includes pre-existing roof beams B, B' and joists, such as joist J.

The converted poultry house 10 also includes a truss apparatus 11 mounted to the footers, F, F' and the beams B, B' for supporting the roof structure of the poultry house. Alternatively, the truss apparatus 11 can be mounted atop auxiliary pilings. The truss apparatus includes a first truss section 12, a second truss section 13 and a third truss section 14. The first truss section 12 is an outer truss section, as is truss section 14. Each of the outer truss sections includes a substantially upright lower portion 16, 17 and an inclined portion 18, 19 extending therefrom toward the center truss section 13. The lower ends of the lower portions 16, 17 are mounted to the footers using pivotal mounting feet 21, 22 as will be described in more detail in connection with another drawing figure. The other ends (the uppermost ends) of the outer truss sections are bolted to the ends of the center truss section 13 and indicated at 23 and 24. This also will be discussed in more detail in connection with another drawing figure.

Each of the truss sections 12–14 is made up of angled steel which has been welded together to form into the individual truss sections and then hot-dip galvanized to resist the rather caustic environment of a poultry house (inside the poultry house often contains strong concentrations of ammonia as a result of the poultry urine on the floor. By fabricating the individual truss sections and then galvanizing the sections afterward, the resulting truss is highly resistant to corrosion once installed. Other corrosion-resistant treatments could be employed or the trusses could be made from stainless steel.

To connect the center truss 13 to the roof structure, brackets 26, 27 are mounted to the beams B, B' and then secured to the center truss section 13. This feature will be described in more detail in connection with a subsequent drawing figure.

Each of the truss sections is made from angled steel to form upper and lower chords, such as upper chord 28 and lower chord 29 of center truss section 13. Also, a large number of steel webs, such as web 30, are welded to and extend between the upper and lower chords. As is conventionally known, such webs tend to make the truss very rigid and help to distribute and carry the load thereon.

Figure 4:
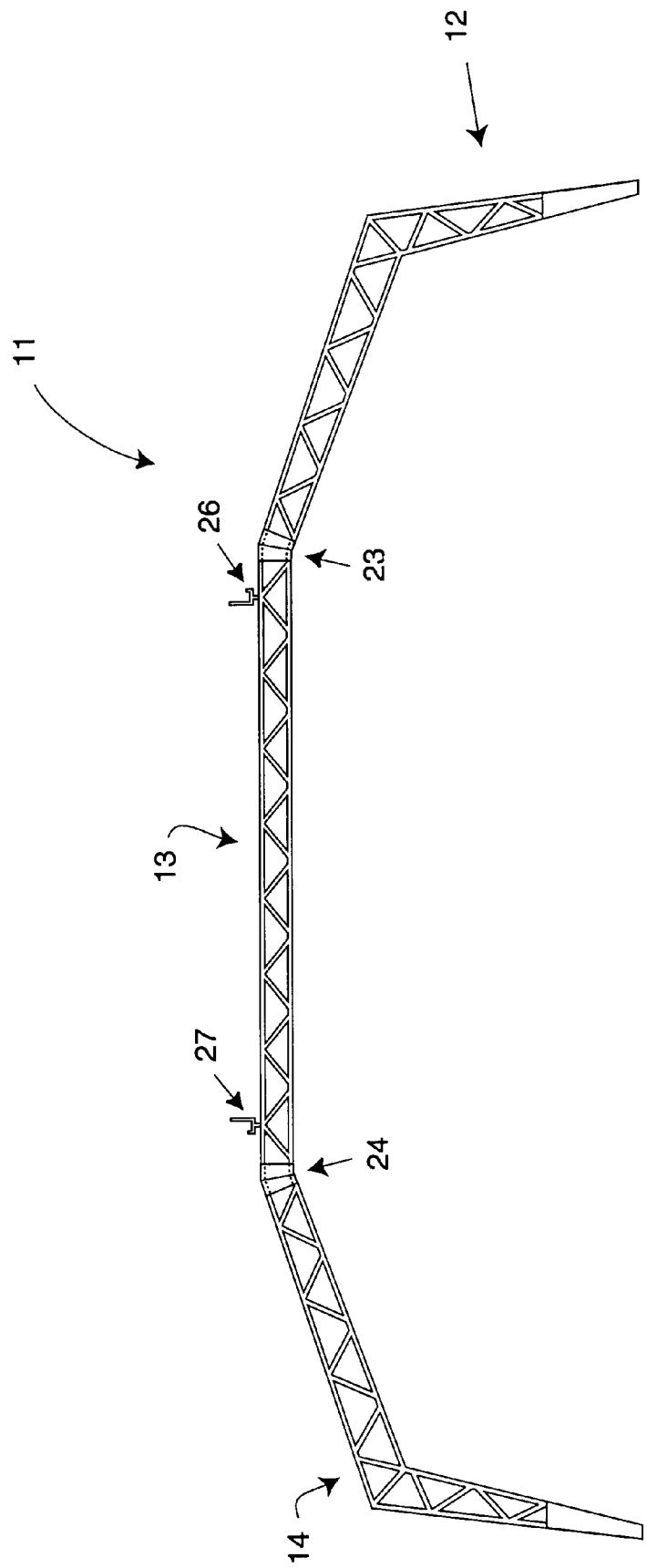
FIG. 4 is an illustration of a truss according to the invention of FIG. 3.

FIG. 4 shows the truss assembly 11 in isolation including the outer truss sections 12 and 14 and the center truss section 13.

Figure 4A:
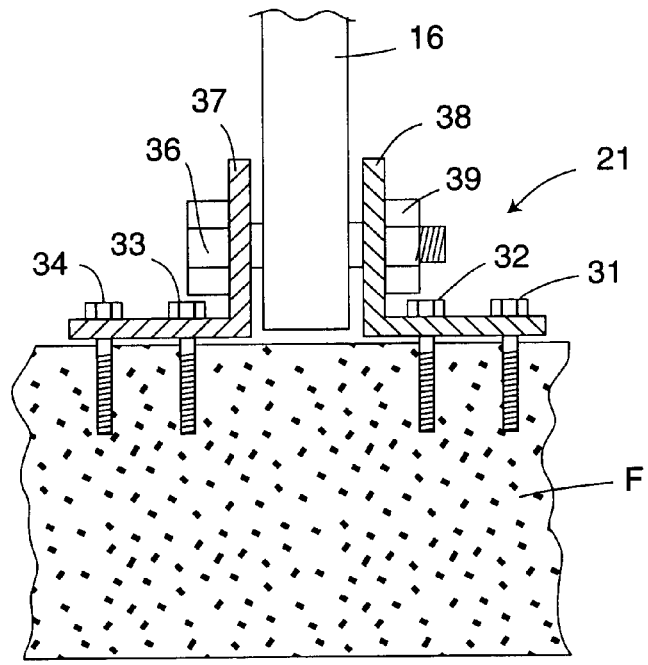
FIG. 4A is a schematic, sectional view of a pivotal mounting foot portion of the truss of FIG. 3.

FIG. 4A shows in detail a pivotal mounting foot 21 for pivotally mounting a lower portion 16 of outer truss section 12 to the footer F. In this regard, the pivotal mounting foot 21 straddles the lower-most portion of the outer truss section and is bolted to the concrete footer F using bolts, such as bolts 31–34. A clevis bolt 36 extends through an upstanding flange 37, through the truss section 16, and through an opposing upstanding flange 38 and is secured in place with a threaded nut 39. The shaft of the clevis bolt 36 acts as a pivot pin about which the outer truss section can pivot. As will become apparent subsequently, this can greatly ease the installation of the outer sections of the truss assembly.

Figure 4B:
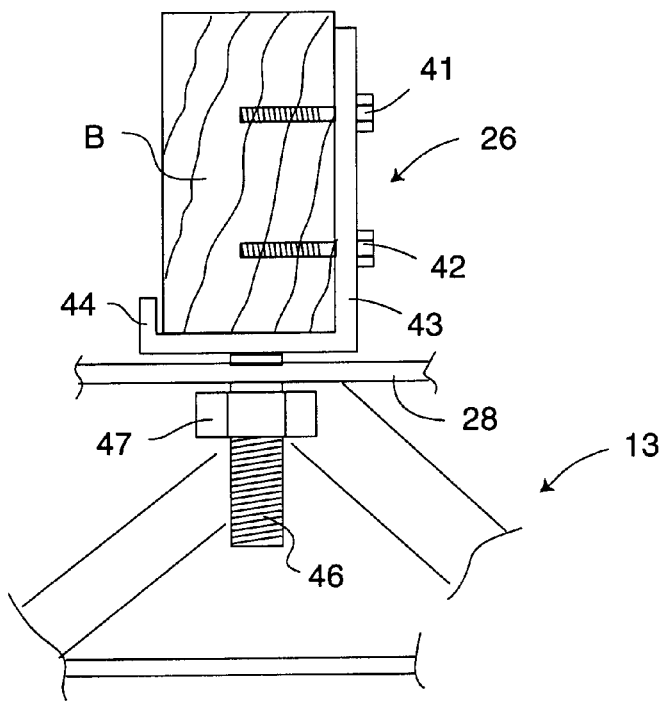
FIG. 4B is a schematic view of an upper mounting bracket portion of the truss of FIG. 3 for mounting a center truss section to a roof joist.

FIG. 4B shows the construction and operation of one of the upper mounting brackets, such as bracket 26 in greater detail. The bracket 26 is shown bolted to a wood roof beam B using threaded bolts 41 and 42. As can be seen in FIG. 4B, the bracket 26 is generally J-shaped to present an upright flange 43 for securement to the side of the beam. A short second upright flange 44 helps to capture the beam B and to accurately position the bracket relative to the beam. A large footed stud or bolt 46 extends through the upper chord 28 of the center truss section 13 and secures the center truss section against the mounting bracket with a corresponding nut 47.

Figure 4C:
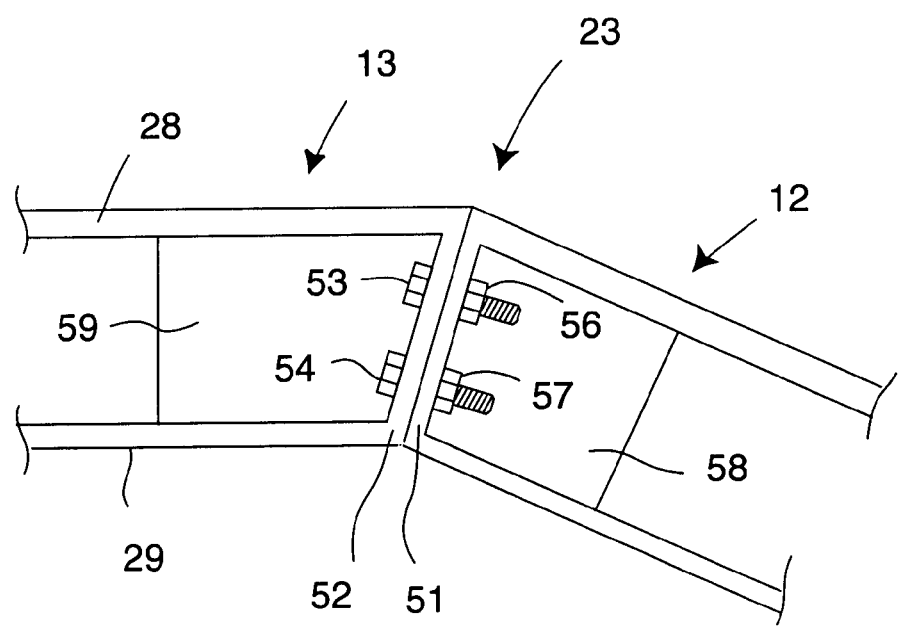
FIG. 4C is a detailed view of a portion of the truss of FIG. 3, showing the bolted-together connection of two portions thereof.

FIG. 4C shows the bolted connection between the outer truss sections and the center truss section, such a bolted connection 23 depicted here. As can be seen in this figure, the outer truss section 12 includes an end flange 51, while the center truss section 13 includes a corresponding end flange 52. The end flanges 51 and 52 are configured and positioned to face and match each other and are secured to each other using bolts 53 and 54 and nuts 56 and 57. The end flanges 51 and 52 are reinforced by trapezoidal webs 58 and 59 which are welded on three sides to the upper and lower flanges and the end flanges of each of the truss sections.

Figure 4D:
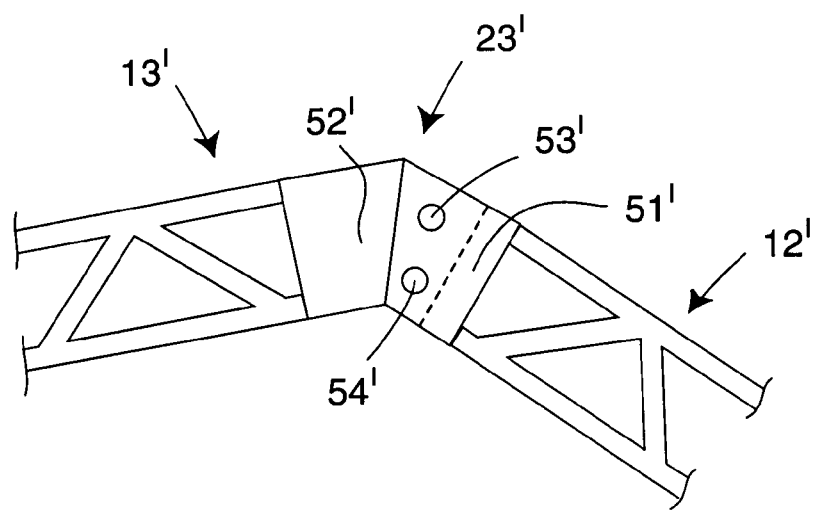
FIG. 4D is a detailed view of a portion of the truss of FIG. 4C, in a modified form.

FIG. 4D shows an alternative bolted connection 23' between the outer truss sections and the center truss section. As shown in FIG. 4D each truss section includes side flanges, such as side flanges, which can be place one against another and manipulated until bolt holes are aligned to receive bolts 54', 54' to secure the truss sections. Together, such as truss sections 12' and 13'.

To guard against corrosion, all of the fasteners used in connection with the truss assembly are made of stainless steel. Alternatively, other corrosion-resistant fasteners can be employed, such as hot-dip galvanized structural fasteners.

Figure 5C:
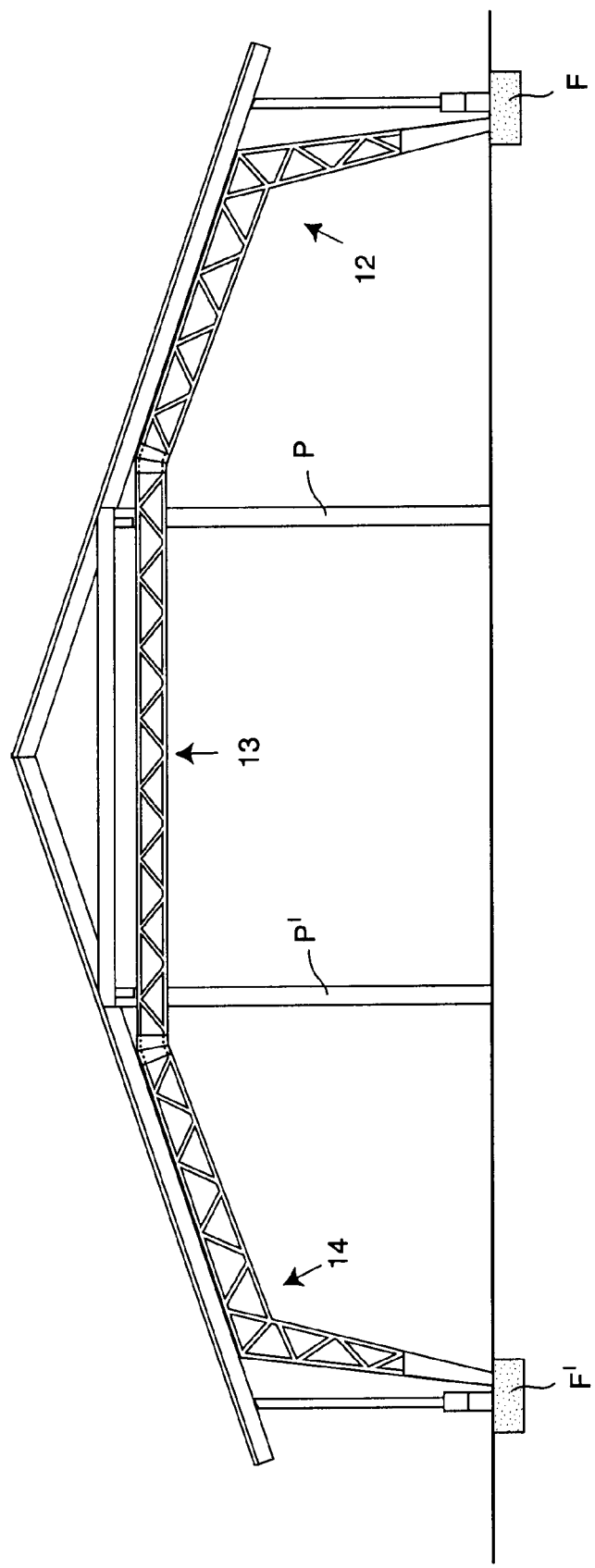

FIGS. 5A through 5C depict the sequence of major operations in converting the post-style poultry house of FIG. 1 into a converted poultry house according to FIG. 3, according to a preferred form of the invention. As shown in FIG. 5A, the first major step is to mount the center truss section 13 to the beams B, B'. With the center section 13 positioned and secured, the next step is to position and secure the outer sections 12 and 14. As shown in FIG. 5B, the outer truss sections 12 and 14 can be placed with their bottom-most portion (including their mounting feet) over the footers and then lifted up so that the opposite ends of the outer truss sections 12 and 14 are moved in the direct of direction arrows 61 and 62 until the position of FIG. 5C is achieved. Once the outer truss sections 12 and 14 are in this position, they are bolted to the ends of the center truss section as depicted in FIG. 4C. The bottom-most portion of the upright portion of the outer truss sections is then bolted to the concrete footers using the pivotal mounting feet. In this regard, the mounting feet have two nice advantages. Firstly, the pivotal nature of the mounting feet helps in raising the outer truss sections into position smoothly and safely. Secondly, the pivotal mounting feet ensure that the mounting of the outer truss sections to the concrete footers can be accomplished without special alignment concerns. In this regard, the pivotal mounting feet quickly and automatically conform to the upper surface of the concrete footers.

With the truss assembly now complete, bolted together and bolted to the concrete footers and to the beams, all that remains is to cut off the posts P, P' and to remove them to achieve the clear span, converted poultry house configuration of FIG. 3.

Figures 6, 7:
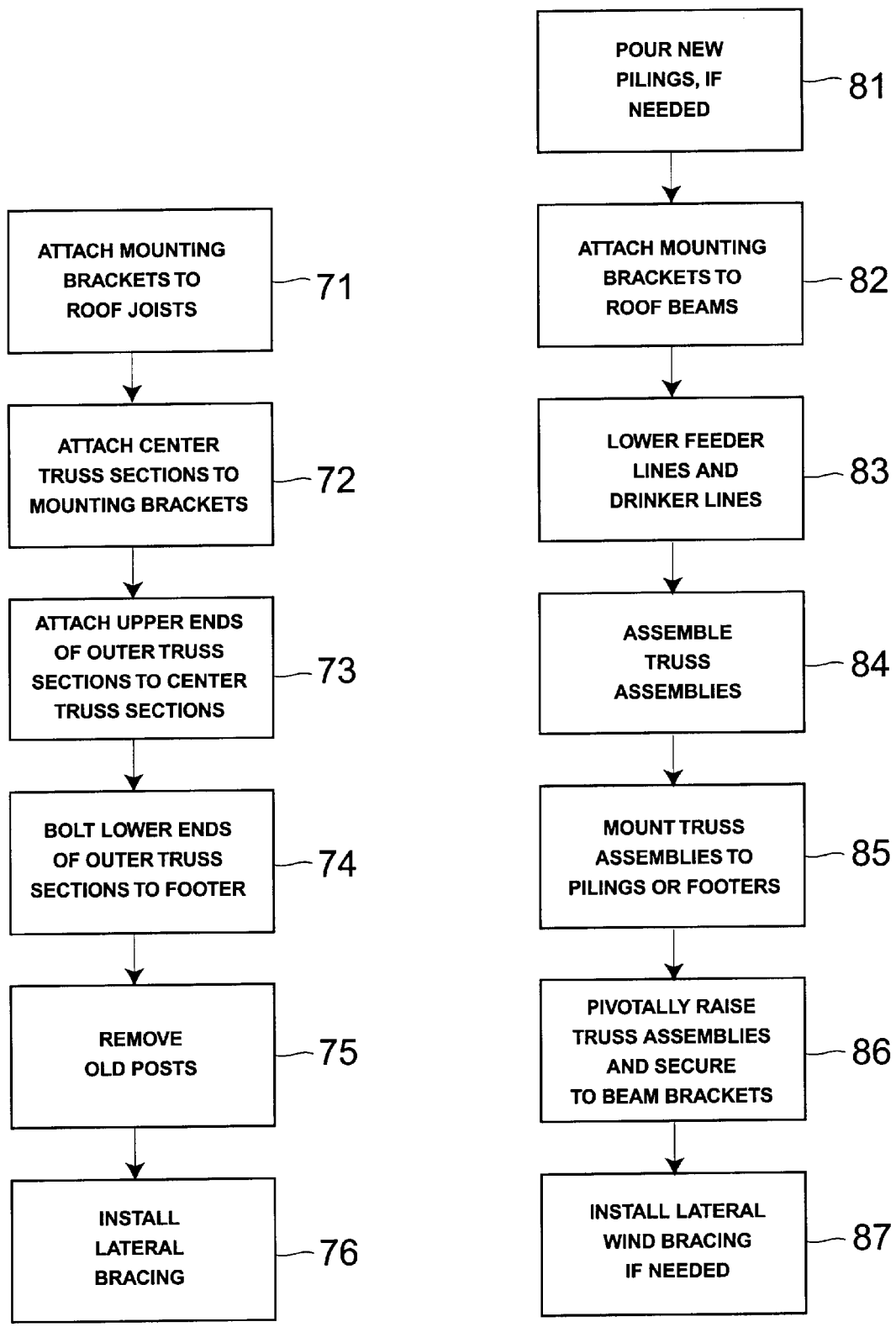
FIG. 6 is a block diagram of a method according to the present invention for converting a post-style poultry house to a clear span-style poultry house.
FIG. 7 is a block diagram of another method according to the present invention for converting a post-style poultry house.

As is succinctly depicted in FIG. 6, the method according to the present invention of converting the post-style house as just described into a converted clear span poultry house comprises five primary steps. Firstly, as shown in process step box 71, the first step is to attach the mounting brackets to the roof joists. As shown in process step box 72, the next step is to attach the center truss sections to the mounting brackets. As shown in process step box 73, the next step is to attach the upper ends of the outer truss sections to the center truss sections. As shown in process step box 74, the next step is to bolt the lower ends of the outer truss sections to the footers. Finally, as shown in process step box 75, the final step is to remove the old posts. Finally, steps 75 and 76 can be done simultaneously which includes installing lateral bracing and removal of posts.

Alternatively, as shown in FIG. 7, the post-style poultry house can be converted to a clear span poultry house according to another form of the invention. As depicted in FIG. 7, preferably, the first step 81 comprises pouring new auxiliary concrete pilings, if necessary. Secondly, the next step preferably comprises attaching beam mounting brackets to the roof beams. Preferably, the next step 83 comprises lowering any feeder lines or drinker lines to provide better access. Preferably, the next step 85 comprises placing individual truss components within the poultry house near the particular place to be installed and assembling the individual components into completed individual truss assemblies. Preferably, the next step 85 comprises mounting the completed truss assemblies to the pilings (or to existing footers) with pivotal mounting feet. Preferably, the next step 86 comprises pivoting the truss assemblies upwardly about the pivotal mounting feet to bring the truss assemblies to beneath and adjacent the beam mounting brackets and securing the truss assemblies thereto. Preferably, the next step 87 comprises installing lateral wind bracing, if needed. With the trusses thus pivotally mounted to the pilings or footers, it is important to install such lateral bracing to rigidify the collective trusses longitudinally (lengthwise along the poultry house). Such bracing can be in the form of cables or struts.

Advantageously the assembly of the individual truss sections into a completed truss can take place at ground level, instead of doing so overhead. Working with the truss sections overhead is more tiring than working with them at ground level.

While the invention has been disclosed in preferred forms, it will be apparent to those skilled in the art that many modifications, additions, and deletions can be made therein without departing from the spirit and scope of the invention as set forth in the following claims.

I claim:

1. A method for converting a post-style poultry house to a clear span-style poultry house, the poultry house being mounted on footers and including a roof, inclined rafters supporting the roof, roof beams extending transversely to the rafters and supporting the rafters, and initially including upright posts supporting the roof beams, the method comprising the steps of:

(a) installing a series of trusses for supporting the roof beams, the step of installing a series of trusses being carried out without removal of the roof or rafters, the trusses being provided for supporting the roof beams and the roof thereupon, each of the trusses having a center section and two outer sections, the step of installing the trusses in turn comprising (i) attaching the center sections of the trusses to the roof beams, (ii) attaching upper ends of the outer sections to the center sections, and (iii) securing the lower ends of the outer sections to the footers; and (b) removing the upright posts from the poultry house.

2. The method as claimed in claim 1 wherein the step of attaching the center sections to the roof beams comprises attaching mounting brackets to the roof beams and attaching the center sections to the mounting brackets.

3. The method as claimed in claim 1 wherein the step of attaching the upper ends of the outer sections to the center sections comprises bolting the upper ends of the outer sections to the center sections.

4. The method as claimed in claim 1 further comprising the step of lowering any feeding lines and any watering lines in the poultry house prior to completion of the step of installing the trusses.

5. The method as claimed in claim 1 wherein the step of installing the trusses further comprises installing lateral braces to brace the truss sections.

6. A method for converting a post-style poultry house to a clear span poultry house, the poultry house including a roof, roof rafters supporting the roof, roof beams extending transversely to the rafters and supporting the rafters thereon, and initially including upright posts supporting the roof joists, the method comprising the steps of:

(a) installing a series of trusses for supporting the roof beams, said step of installing a series of trusses being carried out without removal of the roof or roof rafters, said trusses being provided for supporting the roof beams and the roof thereupon; and (b) removing the uprights posts from the poultry house after the trusses are installed.

7. A method as claimed in claim 6 wherein each of the trusses comprises a plurality of individual pieces and wherein the step of placing the trusses comprises installing the individual pieces in the poultry house, securing the individual pieces to each other to form assembled trusses, and positioning the assembled trusses under and adjacent the roof beams and securing the assembled trusses thereto.

8. A method as claimed in claim 7 wherein the step of securing the individual pieces of the trusses together comprises bolting individual pieces of the trusses together.

9. A method as claimed in claim 7 wherein the trusses are made of three sections.

10. A method as claimed in claim 9 wherein one of the three sections of each truss comprises a lateral truss member end.

11. A method as claimed in claim 6 wherein the poultry house has feeding and watering equipment positioned therein and suspended from the rafters and wherein the step of installing the trusses is carried out without removal of the feeding and watering equipment.

12. A method as claimed in claim 6 wherein the trusses are made of corrosion-resistant steel.

13. A method as claimed in claim 6 wherein said step of installing a series of trusses comprises pivotally securing lower portions of the trusses and pivoting the trusses upwardly into position beneath and adjacent the roof beams and securing the trusses to the roof beams.

* * * * *